(12) United States Patent
Mailand et al.

(10) Patent No.: US 6,241,022 B1
(45) Date of Patent: Jun. 5, 2001

(54) CONTROL LINE CONNECTOR

(75) Inventors: Jason C. Mailand; Thomas M. Deaton, both of Houston, TX (US)

(73) Assignee: Camco International Inc., Houston, TX (US)

( * ) Notice: Subject to any disclaimer, the term of this patent is extended or adjusted under 35 U.S.C. 154(b) by 0 days.

(21) Appl. No.: 09/406,043

(22) Filed: Sep. 27, 1999

Related U.S. Application Data
(60) Provisional application No. 60/103,698, filed on Oct. 9, 1998.

(51) Int. Cl.$^7$ .......................... E21B 17/02; E21B 19/16; F16L 3/12; F16L 17/08; F16L 19/07
(52) U.S. Cl. ................... 166/380; 166/242.6; 285/342; 403/368
(58) Field of Search ..................... 166/65.1, 113, 166/242.6, 372, 380; 285/339, 342, 353; 403/365, 366, 367, 368, 370, 373, 374.1, 374.4

(56) References Cited

U.S. PATENT DOCUMENTS

| | | | |
|---|---|---|---|
| 3,598,429 | * | 8/1971 | Arnold ................................ 285/18 |
| 4,221,447 | | 9/1980 | Powell . |
| 4,266,844 | | 5/1981 | Chelminski . |
| 4,566,540 | * | 1/1986 | Pringle et al. ..................... 166/317 |
| 4,618,198 | | 10/1986 | Dale et al. . |
| 4,637,470 | | 1/1987 | Weathers et al. . |
| 4,703,774 | | 11/1987 | Seehausen . |
| 4,826,218 | * | 5/1989 | Zahuranec .......................... 285/342 |
| 5,221,214 | | 6/1993 | Martin . |
| 5,222,770 | | 6/1993 | Helevirta . |
| 5,226,483 | | 7/1993 | Williamson, Jr. . |
| 5,288,113 | * | 2/1994 | Silvis et al. ........................ 285/342 |
| 5,494,110 | | 2/1996 | Appleford . |
| 5,553,896 | | 9/1996 | Woodward . |
| 5,577,925 | | 11/1996 | Schnatzmeyer et al. . |

* cited by examiner

*Primary Examiner*—William Neuder
*Assistant Examiner*—Jennifer M Hawkins
(74) *Attorney, Agent, or Firm*—Williams Morgan & Amerson

(57) ABSTRACT

The present invention is a connector which connects a first control line in a downhole well tool to a second control line. The connector may include a main body having a longitudinal bore therethrough, a tubular extension threadably secured within a mounting bore in the well tool, and a metal seal ring disposed between a shoulder on the tubular extension of the main body and having an outer conical surface engaged with a conical surface of the mounting bore. The connector may also include a sealing sleeve having a longitudinal bore including a first conical surface adjacent a first end of the sealing sleeve and a second conical surface adjacent a second end of the sealing sleeve; a first ferrule, a second ferrule, and a third ferrule, each being an annular member having an outer conical surface and disposed within the longitudinal bore of the main body. The first ferrule is disposed about the second control line, the outer conical surface of the first ferrule is engaged with the first conical surface on the sealing sleeve; the second ferrule is disposed about the first control line, the outer conical surface of the second ferrule is engaged with the second conical surface on the sealing sleeve; and the third ferrule is disposed about the first control line, the outer conical surface of the third ferrule is engaged with a first conical bore in the main body. A tubular spacer member can be disposed about the first control line and between the second and third ferrules. The connector can further comprise a retaining fitting having a longitudinal bore therethrough and threadably secured within the longitudinal bore of the retaining fitting and the longitudinal bore on the sealing sleeve.

23 Claims, 2 Drawing Sheets

CONTROL LINE CONNECTOR

This application claims the benefit of U.S. Provisional Patent Application No. 60/103,698 filed Oct. 9, 1998.

BACKGROUND OF THE INVENTION

1. Field of the Invention

The present invention relates to subsurface well equipment and, more particularly, to an apparatus and related method for aligning eccentric well tools that are connected to a well tubing.

2. Description of the Related Art

As is well known in the oil and gas industry, when a control line or tubing—such as for delivering hydraulic fluids to downhole fluid-operated well tools or for transmitting chemicals to a desired location for injection into a well—is passed through a downhole well tool, it is often a requirement that the control line or tubing be severed during assembly of various tool components, and then reconnected after tool assembly is complete. Whenever a control line or tubing is severed and then reconnected, there is a possibility of "leak paths" or "weak points" arising in the vicinity where the control line is reconnected. Leak paths and weak points are obviously undesirable, for various reasons well known to those of skill in the art.

There are some mechanisms in the prior art which provide an adequate sealed reconnection to severed lines; however, each of these mechanisms has drawbacks. For instance, it is known in the prior art to reconnect severed lines with a union as long as both severed ends are located outside of well tools. This mechanism has limited application since it is sometimes impractical or impossible to ensure that the ends of severed lines fall outside of well tools. In addition, it is known in the prior art to reconnect severed lines within a well tool utilizing components that are made from non-metal materials. The problems associated with this mechanism are the low reliability and functional life of the non-metal components, particularly when such components are exposed to the harsh downhole environment.

As such, the present invention was developed to provide the industry with a control line connector that meets strength requirements, prevents fluid communication from the control line to the well and/or from the well into the control line, reconnects the relevant severed ends within a well tool (the connection not being externally thereof), and has components that are all made of metal.

SUMMARY OF THE INVENTION

In a broad aspect, the invention is a connector for connecting a first control line in a downhole well tool to a second control line, comprising: a main body having a longitudinal bore therethrough and being threadably secured within a mounting bore in the well tool; a sealing sleeve having a longitudinal bore therethrough and being disposed within the longitudinal bore of the main body, the first and second control lines being disposed within the longitudinal bore of the sealing sleeve at opposite ends thereof; and a retaining fitting having a longitudinal bore therethough and threadably secured to the longitudinal bore of the main body, the second control line being disposed within the longitudinal bore of the retaining fitting, the retaining fitting compressing the sealing sleeve within the longitudinal bore of the main body and about the first and second control lines. Another feature of this aspect of the present invention is that the longitudinal bore of the sealing sleeve includes a first conical surface adjacent a first end of the sealing sleeve and a second conical surface adjacent a second end of the sealing sleeve, and further includes a first ferrule, a second ferrule, and a third ferrule, each being an annular member having an outer conical surface and disposed within the longitudinal bore of the main body, the first ferrule being disposed about the second control line, the outer conical surface of the first ferrule being engaged with the first conical surface on the sealing sleeve, the second ferrule being disposed about the first control line, the outer conical surface of the second ferrule being engaged with the second conical surface on the sealing sleeve, the third ferrule being disposed about the first control line, and the outer conical surface of the third ferrule being engaged with a first conical bore in the main body. Another feature of this aspect of the present invention is that the connector may further include a tubular spacer member disposed about the first control line and between the second and third ferrules. Another feature of this aspect of the present invention is that the connector may further include a metal seal ring disposed between a shoulder on a tubular extension of the main body and having an outer conical surface engaged with a conical surface of the mounting bore. Another feature of this aspect of the present invention is that the metal seal ring is sealably disposed between the shoulder on the tubular extension and the mounting bore.

In another aspect, the present invention may be a connector for connecting a first control line in a downhole well tool to a second control line, comprising: a main body having a longitudinal bore therethrough and a tubular extension threadably secured within a mounting bore in the well tool; a sealing sleeve having a longitudinal bore including a first conical surface adjacent a first end of the sealing sleeve and a second conical surface adjacent a second end of the sealing sleeve; a first ferrule, a second ferrule, and a third ferrule, each being an annular member having an outer conical surface and disposed within the longitudinal bore of the main body; the first ferrule being disposed about the second control line, the outer conical surface of the first ferrule being engaged with the first conical surface on the sealing sleeve; the second ferrule being disposed about the first control line, the outer conical surface of the second ferrule being engaged with the second conical surface on the sealing sleeve; the third ferrule being disposed about the first control line, the outer conical surface of the third ferrule being engaged with a first conical bore in the main body; and a retaining fitting having a longitudinal bore therethough and threadably secured within the longitudinal bore of the main body, the second control line being disposed within the longitudinal bore of the retaining fitting and the longitudinal bore of the sealing sleeve. Another feature of this aspect of the present invention is that the connector may further include a metal seal ring disposed between a shoulder on the tubular extension of the main body and having an outer conical surface engaged with a conical surface of the mounting bore. Another feature of this aspect of the present invention is that the metal seal ring is sealably disposed between the shoulder on the tubular extension and the mounting bore. Another feature of this aspect of the present invention is that the connector may further include a tubular spacer member disposed about the first control line and between the second and third ferrules.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
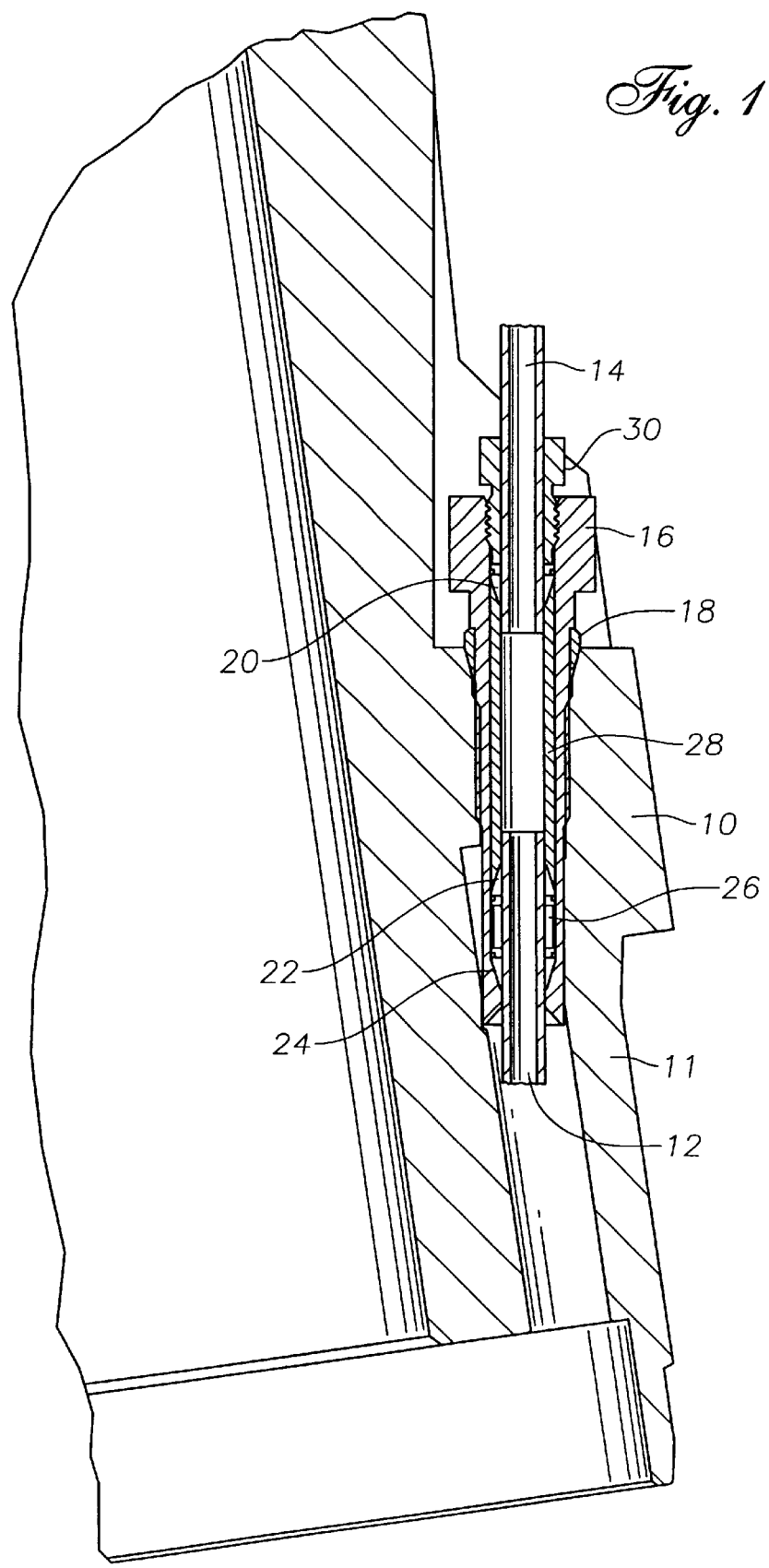
FIG. 1 is a longitudinal cross-sectional view of the present invention.
Figure 2:
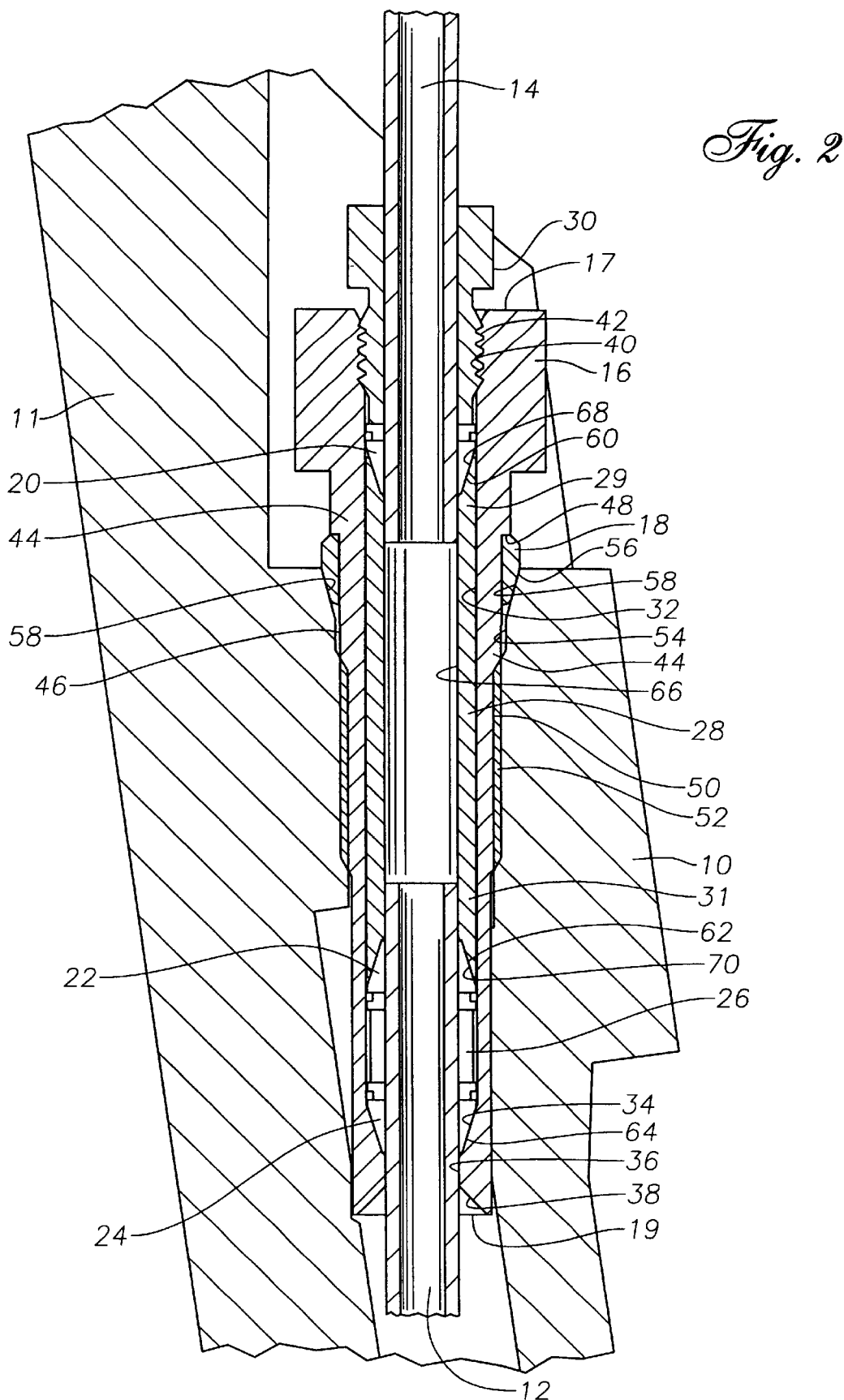
FIG. 2 is an enlarged longitudinal cross-sectional view of part of FIG. 1.

Referring to the drawings in detail, wherein like numerals denote identical elements throughout the multiple views, it can be seen with reference to FIG. 1 that the control line connector 10 of the present invention is shown installed in a downhole well tool 11 and connecting a first control line 12 and a second control line 14. The first control line 12 is disposed within the well tool 11, and has been substantially passed through the length of the well tool 11. The end of the control line 12 shown in FIGS. 1 and 2 is what has been referred to above as the severed end of control line, which is in need of connection to the second control line 14. In a specific embodiment, the connector 10 may include a main body 16, a metal seal ring 18, a first ferrule 20, a second ferrule 22, a third ferrule 24, a tubular spacer member 26, a sealing sleeve 28, and a retaining fitting 30. In a specific embodiment, each of the components 16–30 may be metal.

As best shown in FIG. 2, the main body 16 may include a first longitudinal bore 32 extending from a first end 17 of the main body 16 to a first conical bore 34 in the main body 16, and a second longitudinal bore 36 extending from the conical bore 34 to a second end 19 of the main body 16. The main body 16 may also include a second conical bore 38 extending from the second end 19 to the second longitudinal bore 36, the purpose of which will be explained below. The first longitudinal bore 32 may include first threads 40, such as adjacent the first end 17 of the main body 16, for mating with second threads 42 disposed about the fitting 30, as will be further discussed below. In a specific embodiment, the fitting 30 may be of the type available from Swagelok Company, of Solon, Ohio, such as their "Male Nut" fitting. The main body 16 may include a tubular extension 44 having an outer surface 46 with a shoulder 48 and third threads 50 disposed therein. The third threads 50 mate with fourth threads 52 disposed within a mounting bore 54 in the downhole well tool 11.

The metal seal ring 18 includes an outer conical surface 56 for mating with a conical surface 58 of the mounting bore 54 in the well tool 11. The metal seal ring 18 is adapted to closely surround the outer surface 46 of the tubular extension 44 of the main body 16, and to abut the shoulder 48 on the tubular extension 44. The ferrules 20, 22, and 24 are annular members having outer conical surfaces 60, 62, and 64, respectively, and are adapted to closely surround the first and second control lines 12 and 14. In a specific embodiment, the ferrules 20, 22, and 24 may be of the type available from Swagelok Company, of Solon, Ohio, such as their "Front" 19 ferrule. The sealing sleeve 28 includes a longitudinal bore 66 having a first conical surface 68 at a first end 29 of the sealing sleeve 28 for mating with the outer conical surface 60 of the first ferrule 20, and a second conical surface 70 at a second end 31 of the sealing sleeve 28 for mating with the outer conical surface 62 of the second ferrule 22. The first and second conical surfaces 68 and 70 are disposed at opposite ends of the sealing sleeve 28, and are inclined in opposite directions. Stated differently, when the sealing sleeve 28 is situated as shown in FIGS. 1 and 2, the first conical surface 68 faces "upwardly" and the second conical surface 70 faces "downwardly."

The first step in connecting the first and second control lines 12 and 14 is to insert the tubular extension 44 of the main body 16 through the metal seal ring 18 and into the mounting bore 54 in the well tool 11 so that the first control line 12 is received within at least the second longitudinal bore 36 of the main body 16, and preferably extends into the first longitudinal bore 32 of the main body 16. The second conical bore 38 at the second end 19 of the main body 16 may facilitate guiding the first control line 12 into the first and second longitudinal bores 32 and 36 in the main body 16. The metal seal ring 18 should be disposed about the tubular extension 44 of the main body 16 with its outer conical surface 56 situated to mate with the conical surface 58 of the mounting bore 54. The main body 16 is rotated so as to cause engagement of the third threads 50 in the outer surface 46 of the tubular extension 44 with the fourth threads 52 in the mounting bore 54 of the well tool 11. Continued rotation of the main body 16 will result in relative movement of the first control line 12 into the first longitudinal bore 32 of the main body 16, and will cause the shoulder 48 on the tubular extension 44 to bring the outer conical surface 56 of the metal seal ring 18 into cooperable engagement with the conical surface 58 of the mounting bore 54. Sufficient torque should be applied to the main body 16 so as to crush the metal seal ring 18 between the shoulder 48 and the mounting bore 54 in the well tool 11, thereby forming an initial seal.

Next, the third ferrule 24, the tubular spacer member 26, and the second ferrule 22 are inserted, in that order, into the first longitudinal bore 32 of the main body 16 and about the first control line 12. The third ferrule 24 is inserted with its outer conical surface 64 disposed to mate with the first conical bore 34 in the main body 16 (i.e., facing "downwardly"). The second ferrule 22 is inserted with its outer conical surface 62 disposed in a direction opposite of the direction of the outer conical surface 64 on the third ferrule 24 (i.e., facing "upwardly"). The tubular spacer member 26 is disposed between the second and third ferrules 22 and 24. The sealing sleeve 28 is then inserted into the first longitudinal bore 32 of the main body 16 with a portion of the longitudinal bore 66 of the sealing sleeve 28 disposed about the first control line 12, and with the second conical surface 70 of the longitudinal bore 66 of the sealing sleeve 28 in mating engagement with the "upwardly facing" outer conical surface 62 of the second ferrule 22.

At this point, the second and third ferrules 22 and 24 may be permanently connected to the first control line 12. To do this, a short section of control line (not shown) is inserted past the first conical surface 68 of the sealing sleeve 28 and into the longitudinal bore 66 of the sealing sleeve 28. A sacrificial downward facing ferrule (not shown, but identical in structure to the ferrules 20, 22, and 24) is disposed about the short section of control line (not shown) with its downward facing outer conical surface in mating engagement with the first, or upward facing, conical surface 68 of the sealing sleeve 28. A fitting (not shown, but identical in structure to the fitting 30) is disposed about the short section of control line with its threads 42 engaged with the threads 40 in the longitudinal bore 32 of the main body 16. The fitting is then tightened, such as up to 125% of the required torque. The fitting, the short section of control line, and the sacrificial ferrule are then removed. To complete the connection of the first and second control lines 12 and 14, the second control line 14, the first ferrule 20, and the fitting 30 are inserted and tightened in the same manner as explained above with regard to the short section of control line, the sacrificial ferrule, and the fitting (all not shown).

The interconnection between the ferrules, 20, 22, and 24, the spacer member 26, the sealing sleeve 28, and the fitting 30 ensures the sealing connection between the first and second control lines, 12 and 14. In addition, since such components are all preferably constructed from metal, the reliability and functional life factors of the control line connector 10 are much higher than is the components were constructed from non-metal materials. The all-metal construction of the components and their reliability and functional life factors are particularly relevant and important in the harsh downhole environment.

It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims.

What is claimed is:

1. A connector which connects a first control line in a downhole well tool to a second control line, comprising:
   a main body having a longitudinal bore therethrough and being threadably secured within a mounting bore in the well tool;
   a sealing sleeve having a longitudinal bore therethrough and being disposed within the longitudinal bore of the main body, the first and second control lines being disposed within the longitudinal bore of the sealing sleeve at opposite ends thereof; and
   a retaining fitting having a longitudinal bore therethrough and threadably secured to the longitudinal bore of the main body, the second control line being disposed within the longitudinal bore of the retaining fitting, the retaining fitting compressing the sealing sleeve within the longitudinal bore of the main body and about the first and second control lines.

2. The connector of claim 1, wherein the longitudinal bore of the sealing sleeve includes a first conical surface adjacent a first end of the sealing sleeve and a second conical surface adjacent a second end of the sealing sleeve, and further including a first ferrule, a second ferrule, and a third ferrule, each being an annular member having an outer conical surface and disposed within the longitudinal bore of the main body, the first ferrule being disposed about the second control line, the outer conical surface of the first ferrule being engaged with the first conical surface on the sealing sleeve, the second ferrule being disposed about the first control line, the outer conical surface of the second ferrule being engaged with the second conical surface on the sealing sleeve, the third ferrule being disposed about the first control line, and the outer conical surface of the third ferrule being engaged with a first conical bore in the main body.

3. The connector of claim 2, further including a tubular spacer member disposed about the first control line and between the second and third ferrules.

4. The connector of claim 3, wherein the main body, the sealing sleeve, the retaining fitting, the first ferrule, the second ferrule, the third ferrule, and the tubular spacer member are each made of metal.

5. The connector of claim 1, further including a metal seal ring disposed between a shoulder on a tubular extension of the main body and having an outer conical surface engaged with a conical surface of the mounting bore.

6. The connector of claim 5, wherein the metal seal ring is sealably disposed between the shoulder on the tubular extension and the mounting bore.

7. The connector of claim 1, wherein the main body, the sealing sleeve, and the retaining fitting are each made of metal.

8. The connector of claim 2, wherein the main body includes a second conical bore at the end of the main body distal the mounting bore of the well tool.

9. A connector for connecting a first control line in a downhole well tool to a second control line, comprising:
   a main body having a longitudinal bore therethrough and a tubular extension threadably secured within a mounting bore in the well tool;
   a sealing sleeve having a longitudinal bore including a first conical surface adjacent a first end of the sealing sleeve and a second conical surface adjacent a second end of the sealing sleeve;
   a first ferrule, a second ferrule, and a third ferrule, each being an annular member having an outer conical surface and disposed within the longitudinal bore of the main body;
   the first ferrule being disposed about the second control line, the outer conical surface of the first ferrule being engaged with the first conical surface on the sealing sleeve;
   the second ferrule being disposed about the first control line, the outer conical surface of the second ferrule being engaged with the second conical surface on the sealing sleeve;
   the third ferrule being disposed about the first control line, the outer conical surface of the third ferrule being engaged with a first conical bore in the main body; and
   a retaining fitting having a longitudinal bore therethough and threadably secured within the longitudinal bore of the main body, the second control line being disposed within the longitudinal bore of the retaining fitting and the longitudinal bore of the sealing sleeve.

10. The connector of claim 9, wherein the main body, the sealing sleeve, the retaining fitting, the first ferrule, the second ferrule, and the third ferrule are each made of metal.

11. The connector of claim 9, further including a metal seal ring disposed between a shoulder on the tubular extension of the main body and having an outer conical surface engaged with a conical surface of the mounting bore.

12. The connector of claim 11, wherein the metal seal ring is sealably disposed between the shoulder on the tubular extension and the mounting bore.

13. The connector of claim 9, further including a tubular spacer member disposed about the first control line and between the second and third ferrules.

14. The connector of claim 13, wherein the main body, the sealing sleeve, the retaining fitting, the first ferrule, the second ferrule, the third ferrule, and the tubular spacer member are each made of metal.

15. The connector of claim 9, wherein the main body includes a second conical bore at the end of the main body distal the mounting bore of the well tool.

16. A connector which connects a first control line in a downhole well tool to a second control line, comprising:
   a plurality of components made of metal, the components including a main body having a longitudinal bore, a sealing sleeve having a longitudinal bore, and a retaining fitting having a longitudinal bore and threadably secured within the longitudinal bore of the main body, the second control line being disposed within the longitudinal bore of the retaining fitting and the longitudinal bore of the sealing sleeve;
   the first control line including a connecting end disposed within the well tool; and
   the components sealably engaged to the well tool, the first control line connecting end, and the second control line, thereby connecting the first and second control lines and preventing fluid communication to and from the first and second control line connection and the well.

17. A method for connecting a connecting end of a first control line in a downhole well tool to a second control line, comprising:

securing a metal connector at least partially within a mounting bore of the well tool, the connector comprising a sealing sleeve having a longitudinal bore therethrough, the connector enclosing at least the connecting end of the first control line, the first control line connecting end disposed within the longitudinal bore of the sealing sleeve;

inserting the second control line in the connector thereby establishing the connection between the first control line and the second control line; and sealing the connection between the first control line and the second control line so as to prevent fluid communication to and from the first and second control line connection and the well.

18. The method of claim 17, further comprising guiding the insertion of the first control line connecting end into the connector.

19. The method of claim 17, wherein the securing and inserting steps comprise:

threadably securing a main body of the connector to the mounting bore, the main body having a longitudinal bore therethrough;

disposing the sealing sleeve of the connector within the longitudinal bore of the main body, the sealing sleeve itself having a longitudinal bore therethrough with the first control line connecting end disposed therein;

threadably securing a retaining fitting to the longitudinal bore of the main body, the retaining fitting itself having a longitudinal bore therethrough with the second control line disposed therein and the second control line extending into the longitudinal bore of the sealing sleeve; and compressing the sealing sleeve within the longitudinal bore of the main body and about the first and second control lines.

20. The method of claim 19, further comprising:

disposing a third annular ferrule about the first control line, the outer conical surface of the third ferrule being engaged to a first conical bore in the main body;

disposing a second annular ferrule about the first control line;

disposing the sealing sleeve within the longitudinal bore of the main body, the outer conical surface of the second ferrule being engaged to a second conical surface on the sealing sleeve; and disposing a first annular ferrule about the second control line, the outer conical surface of the first ferrule being engaged to a first conical surface on the sealing sleeve.

21. The method of claim 20, further comprising disposing a tubular spacer member after the third ferrule but before the second ferrule, the tubular spacer member being located intermediate the third ferrule and the second ferrule and being engaged to each.

22. The method of claim 21, further comprising providing a metal seal ring between an external shoulder of the main body and a conical surface of the mounting bore.

23. The method of claim 22, further comprising pre-loading the third ferrule and the second ferrule prior to disposing the first ferrule about the second control line.

* * * * *